United States Patent
Maier et al.

(10) Patent No.: US 11,965,140 B2
(45) Date of Patent: Apr. 23, 2024

(54) HIGH VISCOSITY POLYACRYLATE BASE FLUIDS

(71) Applicant: Evonik Operations GmbH, Essen (DE)

(72) Inventors: Stefan Karl Maier, Ober-Ramstadt (DE); Michael Neusius, Darmstadt (DE); Qi Xiao, Shanghai (CN); Gabriela Fedor, Frankfurt (DE); Stefan Hilf, Zwingenberg (DE); Frank-Olaf Mähling, Mannheim (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/757,031

(22) PCT Filed: Dec. 12, 2019

(86) PCT No.: PCT/CN2019/124923
§ 371 (c)(1),
(2) Date: Jun. 8, 2022

(87) PCT Pub. No.: WO2021/114187
PCT Pub. Date: Jun. 17, 2021

(65) Prior Publication Data
US 2022/0372388 A1 Nov. 24, 2022

(51) Int. Cl.
*C10M 107/28* (2006.01)
*C08F 20/16* (2006.01)
*C10N 20/04* (2006.01)
*C10N 40/04* (2006.01)

(52) U.S. Cl.
CPC ........... *C10M 107/28* (2013.01); *C08F 20/16* (2013.01); *C10M 2203/003* (2013.01); *C10M 2209/0845* (2013.01); *C10N 2020/04* (2013.01); *C10N 2040/04* (2013.01)

(58) Field of Classification Search
CPC .............. C10M 107/28; C10M 145/14; C10M 2203/003; C10M 2209/084; C10M 2209/0845; C10N 2020/04; C10N 2040/04
See application file for complete search history.

(56) References Cited

U.S. PATENT DOCUMENTS

| | | | | |
|---|---|---|---|---|
| 4,822,508 A | * | 4/1989 | Pennewiss | C10M 149/04 508/296 |
| 5,043,087 A | * | 8/1991 | Pennewiss | C10M 143/12 508/296 |
| 5,188,770 A | * | 2/1993 | Pennewiss | C10M 157/00 508/249 |
| 5,691,284 A | * | 11/1997 | Beyer | C10M 143/00 508/472 |
| 2008/0058234 A1 | * | 3/2008 | Morishita | C08L 53/00 508/469 |
| 2012/0245068 A1 | | 9/2012 | Scanlon et al. | |
| 2013/0229016 A1 | | 9/2013 | Ghahary et al. | |
| 2019/0177640 A1 | | 6/2019 | Klein et al. | |
| 2022/0195091 A1 | * | 6/2022 | Maier | C10M 107/28 |
| 2022/0251266 A1 | * | 8/2022 | Yamamoto | C08F 220/1812 |

FOREIGN PATENT DOCUMENTS

| | | |
|---|---|---|
| EP | 0937769 | 8/1999 |
| EP | 1795581 | 6/2007 |
| EP | 3380593 | 2/2019 |
| JP | 2010037421 | 2/2010 |
| JP | 2019172763 | 10/2019 |
| RU | 2467022 | 11/2012 |
| WO | 2018/083027 | 5/2018 |

OTHER PUBLICATIONS

Bataille et al., "Preparation and Characterization of a Viscosity Index Improper for Naphthenic and Paraffinic Base Oils", Journal of Solution Chemistry, vol. 23, No. 2, 1994, pp. 325-338.
International Search Report dated Sep. 16, 2020 in PCT/CN2019/124923, 6 pages.
Mohamad et al., "Investigation of polyacrylates copolymers as lube oil viscosity index improvers", Journal of Petroleum Science and Engineering, vol. 100, 2012, pp. 173-177.
Ray et al., "Poly-α-olefin-based synthetic lubricants: a short review on various synthetic routes", Lubrication Science, vol. 24, 2012, pp. 23-44.
Written Opinion dated Sep. 16, 2020 in PCT/CN2019/124923, 5 pages.
Pavlov K. F., Romankov P. G., Noskov A. A., "Primery i zadachi po kursu processov i apparatov khimicheskoj tehnologii", Textbook. Edited by P. G. Romankov, 10th edition. L: Chemistry, 1987, 576 pages, cf. p. 282.

* cited by examiner

*Primary Examiner* — Ellen M McAvoy
(74) *Attorney, Agent, or Firm* — Grüneberg and Myers PLLC

(57) ABSTRACT

Low molecular weight polyalkyl acrylate polymers can be used as high viscosity base fluids. A corresponding method can be used for their preparation. Lubricant compositions may contain such low molecular weight polyalkyl acrylate polymers and the compositions may be used as automatic transmission fluids, manual transmission fluids, continuously variable transmission fluids, gear oil formulations, industrial gear oil formulations, axle fluid formulations, dual clutch transmission fluids, dedicated hybrid transmission fluids, or hydraulic oils.

18 Claims, No Drawings

HIGH VISCOSITY POLYACRYLATE BASE FLUIDS

CROSS-REFERENCE TO RELATED APPLICATIONS

This application is the National Stage entry under § 371 of International Application No. PCT/CN2019/124923, filed on Dec. 12, 2019. The content of this application is hereby incorporated by reference in its entirety.

BACKGROUND OF THE INVENTION

Field of the Invention

The present invention is directed to low molecular weight polyalkyl acrylate polymers, a method for their preparation and their use as high viscosity base fluids. It is further directed to lubricant compositions comprising such low molecular weight polyalkyl acrylate polymers and to the use of such compositions as automatic transmission fluids, manual transmission fluids, continuously variable transmission fluids, gear oil formulations, industrial gear oil formulations, axle fluid formulations, dual clutch transmission fluids, dedicated hybrid transmission fluids or as hydraulic oils.

Description of Related Art

High viscosity base fluids are commonly used to lift the viscosity index (VI) and to thicken lubricant formulations with demanding shear stability requirements. A typical application are gear oils which have very demanding requirements due to high mechanical stress and a broad temperature range in operation.

High viscosity base fluids are known to have a kinematic viscosity at 100° C. (KV100) of 30 to 1000 cSt.

Industrial gearboxes are expected to perform under conditions of high heat and heavy loads; and in environments often contaminated with dirt, process debris and water. Without adequate protection, gears will wear prematurely. That means that certain parts have to be replaced more frequently, the oil has to be changed more frequently, and worst of all, equipment downtime has to be expected.

Today's gear driven equipment is designed to perform in many applications, often having to withstand harsh environments. Typically, gear boxes are becoming smaller and are being made from lighter and more sophisticated materials, yet they must be more durable than ever before. As a result, greater demands are being placed upon the gear oil lubricant and greater consideration must be given to the use of high-performance base fluids and additives.

Typical products in this market are high viscosity poly-alphaolefins (PAOs) and metallocene catalyzed PAOs (mPAOs), typically sold in viscosity ranges of 40 to 300 cSt at 100° C. (Choudary et al. Lubr. Sci. 2012, 23-44). Formulations based on high viscosity PAOs are known to have the best performance at low temperatures, but their weakness is the low polarity. Due to the apolar nature of PAO base oils, dispersion inhibitor (DI) packages and ageing products are poorly dissolved in the oil causing various problems.

Higher polarity is provided by copolymers of alpha-olefins with maleates (U.S. Pat. No. 5,435,928), oligomers of alpha-olefins with alkyl acrylates (U.S. Pat. No. 3,968,148) or copolymers of alpha-olefins with alkyl methacrylates (U.S. Pat. No. 5,691,284). Alternatively, PAOs with ester-functionalized monomers (EP2970532) or polyvinylethers (US 2013/0165360) can be applied. A big advantage of using polar high viscosity base fluids is that no polar low viscous fluids, such as esters, must be used as compatibilizers for the DI package. Polar low viscous fluids are known to cause problems with coatings and seals which is less of an issue for high viscosity fluids.

Another class of high viscosity base fluids are polyalkyl (meth)acrylates (PAMAs) (US 2013/229016). PAMAs are well-known for their use as VI improvers in lubricants and can be tuned to reach the highest performance level.

US 2013/229016 is directed to lubricants for transmission systems and wind power plants, comprising at least 30% by weight of a polyalkyl methacrylate. The working examples disclosed do all consist of methacrylates containing alkyl side-chains with a minimum of 10 carbon atoms. Pure alkyl acrylates are not disclosed.

Alkyl acrylates are not used in VI improver application. While literature (Rashad et al. J. of Petr. Sci. and Engineering 2012, 173-177; Evin et al. J. of Sol. Chem 1994, 325-338) and patents (WO 96/17517) exist, it is generally known that the performance of polyacrylates as VI improver is inferior to the one of polymethacrylates. Especially in WO 96/17517 it is mentioned that it was unexpectedly found that poly(alkyl acrylate) esters typically fail to adequately reduce the effect of temperature on viscosity when used in the hydraulic fluids.

Branched alcohols are commonly used for the preparation of PAMA VI improvers. Among others, the mono-branched long-chain Guerbet alcohols are known to be one of the alcohol classes that provide a favorable branching pattern for use as VI improvers (US 2004/0077509). The branching inhibits crystallization of the alcohols; and when they are incorporated into a polymer, it will keep the polymer chains from crystallizing.

Short-chain alcohols with branching pattern, such as ethylhexanol and propylheptanol, are accessible via a reaction sequence involving hydroformylation and aldol condensation, starting from propene or butene, respectively. These alcohols are commercially highly attractive as they are produced on large industrial scale for a variety of applications. The use of polymers comprising ethylhexyl methacrylate (EP 0 937 769) and/or propylheptyl methacrylate (US 2012/245068) as PAMA VI improvers is described in the known literature.

SUMMARY OF THE INVENTION

It was now surprisingly found that high viscosity base fluids prepared from low molecular weight polyalkyl acrylates perform remarkably different than low molecular weight polyalkyl methacrylates. Polyalkyl acrylates comprising at least 95% by weight of acrylates show excellent oil solubility, even at lower temperatures, compared to corresponding polyalkyl methacrylates, although the polyalkyl acrylates have a lower ratio of carbon to oxygen.

A first object of the present invention is therefore directed to polyalkyl acrylates, comprising:
  (a) 95 to 100% by weight of branched $C_{8-10}$-alkyl acrylates; and
  (b) 0 to 5% by weight of $C_{1-20}$-alkyl (meth)acrylates,
characterized in that the weight-average molecular weight is in the range of 7,000 to 25,000 g/mol and the residual monomer content is 0.1% or lower.

The content of each component (a) and (b) is based on the total composition of the polyalkyl acrylate. In a particular embodiment, the proportions of components (a) and (b) add up to 100% by weight.

DETAILED DESCRIPTION OF THE INVENTION

The molar ratio of carbon to oxygen in the polyalkyl acrylates are preferably in the range of 4.5:1 to 7.5:1, more preferably in the range of 5:1 to 7:1, and even more preferably in the range of 5.5:1 to 6.5:1.

The weight-average molecular weight $M_w$ of the polyalkyl acrylate polymers according to the present invention is preferably in the range from 10,000 to 20,000 g/mol.

Preferably, the polyalkyl acrylate polymers according to the present invention have a polydispersity index (PDI) $M_w/M_n$ in the range of 1.5 to 3.5, more preferably in the range of 1.5 to 3.

$M_w$ and $M_n$ are determined by size exclusion chromatography (SEC) using commercially available polymethylmethacrylate standards. The determination is affected by gel permeation chromatography with THF as eluent.

The term "acrylate" refers to esters of acrylic acid; the term "(meth)acrylate" refers to both, esters of acrylic acid and esters of methacrylic acid.

The branched $C_{8-10}$ alkyl acrylates for use in accordance with the invention are esters of acrylic acid and branched alcohols having 8 to 10 carbon atoms. The term "$C_{8-10}$ alkyl acrylates" encompasses individual acrylic esters with an alcohol of a particular length, and likewise mixtures of acrylic esters with alcohols of different lengths.

The suitable branched $C_{8-10}$ alkyl acrylates include, for example, 2-ethylhexyl acrylate, 3-isopropyl-heptyl acrylate and iso-decyl acrylate.

The $C_{1-20}$ alkyl (meth)acrylates for use in accordance with the invention are esters of (meth)acrylic acid and straight chain or branched alcohols having 1 to 20 carbon atoms and are different to the branched $C_{8-10}$ alkyl acrylates as described further above. The term "$C_{1-20}$ alkyl methacrylates" encompasses individual (meth)acrylic esters with an alcohol of a particular length, and likewise mixtures of (meth)acrylic esters with alcohols of different lengths.

Suitable $C_{1-20}$ alkyl (meth)acrylates include, for example, methyl (meth)acrylate, ethyl (meth)acrylate, n-propyl (meth)acrylate), iso-propyl (meth)acrylate, n-butyl (meth)acrylate, iso-butyl (meth)acrylate, tert-butyl (meth)acrylate, pentyl (meth)acrylate, hexyl (meth)acrylate, heptyl (meth)acrylate, octyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate heptadecyl (meth)acrylate, octadecyl (meth)acrylate, nonadecyl (meth)acrylate and eicosyl (meth)acrylate.

A further first object of the present invention is directed to polyalkyl acrylates, consisting of 100% by weight of branched $C_{8-10}$-alkyl acrylates.

A further first object of the present invention is directed to polyalkyl acrylates, wherein the $C_{8-10}$-alkyl acrylate is selected from the group consisting of ethylhexyl acrylate and propylheptyl acrylate.

A further first object of the present invention is directed to polyalkyl acrylates, wherein the $C_{8-10}$-alkyl acrylate is ethylhexyl acrylate.

A further first object of the present invention is directed to poly-ethylhexyl acrylate, having a weight-average molecular weight is in the range of 10,000 to 20,000 g/mol and being characterized by a residual monomer content of 0.1% or lower.

A second object of the present invention is directed to the use of the polyalkyl acrylates as described herein before as base oils in lubricant formulations, especially in industrial gear oil formulations.

The use is preferably directed to the preparation of ISO 220 formulations or ISO 320 formulations, wherein the $KV_{40}$ of the lubricant formulation is 220 mm²/s±10% or 320 mm²/s±10%, respectively.

The ISO 220 formulation such prepared are characterized by a VI of 125 or higher, preferably in the range of 130 to 150.

The ISO 320 formulation such prepared are characterized by a VI of 140 or higher, preferably in the range of 150 to 180.

A further second object of the present invention is directed to a method of lubricating an industrial gear, comprising the steps of:
(i) using at least one polyalkyl acrylate as described further above as a base oil;
(ii) optionally combining the polyalkyl acrylate with another base oil selected from the group consisting of API Group II oils, API Group III oils, API Group IV oils, and mixtures thereof; and
(iii) applying the formulation prepared under (ii) to an industrial gear.

A third object of the present invention is directed to a base oil composition, comprising:
(A) 70 to 95% by weight of at least one polyalkyl acrylate, comprising:
  (a) 95 to 100% by weight of branched $C_{8-10}$-alkyl acrylates; and
  (b) 0 to 5% by weight of $C_{1-20}$-alkyl (meth)acrylates, characterized in that the weight-average molecular weight is in the range of 7,000 to 25,000 g/mol and the residual monomer content is 0.1% or lower; and
(B) 5 to 30% by weight of a base oil selected from the group consisting of API Group II oils, API Group III oils, API Group IV oils, and mixtures thereof.

The content of each component (A) and (B) is based on the total weight of the base oil composition. In a particular embodiment, the proportions of components (A) and (B) add up to 100% by weight.

The content of each component (a) and (b) is based on the total composition of the polyalkyl acrylate. In a particular embodiment, the proportions of components (a) and (b) add up to 100% by weight.

A further third object of the present invention is directed to a base oil composition, wherein the polyalkyl acrylates (A) consist of 100% by weight of branched $C_{8-10}$-alkyl acrylates.

A further third object of the present invention is directed to a base oil composition, wherein the $C_{8-10}$-alkyl acrylate is selected from the group consisting of ethylhexyl acrylate and propylheptyl acrylate.

A further third object of the present invention is directed to a base oil composition, wherein the $C_{8-10}$-alkyl acrylate is ethylhexyl acrylate.

A further third object of the present invention is directed to a base oil composition, comprising:
(A) 70 to 95% by weight of poly-ethylhexyl acrylate, having a weight-average molecular weight is in the range of 10,000 to 20,000 g/mol and being characterized by a residual monomer content of 0.1% or lower; and
(B) 5 to 30% by weight of a base oil selected from the group consisting of API Group II oils, API Group III oils, API Group IV oils, and mixtures thereof.

A fourth object of the present invention is directed to the use of a base oil composition as described further above for the preparation of an industrial gear oil.

A further fourth object of the present invention is directed to a method of preparing an industrial gear oil composition, the method comprising:
combining 70 to 95% by weight of at least one polyalkyl acrylate, comprising:
(a) 95 to 100% by weight of branched $C_{8-10}$-alkyl acrylates; and
(b) 0 to 5% by weight of $C_{1-20}$-alkyl (meth)acrylates, characterized in that the weight-average molecular weight is in the range of 7,000 to 25,000 g/mol and the residual monomer content is 0.1% or lower, with 5 to 30% by weight of a base oil selected from the group consisting of API Group II oils, API Group III oils, API Group IV oils, and mixtures thereof.

A further fourth object of the present invention is directed to a method of lubricating an industrial gear, comprising the steps of:
(i) preparing a base oil composition as described further above; and
(ii) applying the base oil composition prepared under (i) to an industrial gear.

A fifth object of the present invention is directed to a lubricating composition, comprising:
(A) 20 to 60% by weight of at least one polyalkyl acrylate, comprising:
(a) 95 to 100% by weight of branched $C_{8-10}$-alkyl acrylates; and
(b) 0 to 5% by weight of $C_{1-20}$-alkyl (meth)acrylates, characterized in that the weight-average molecular weight is in the range of 7,000 to 25,000 g/mol and the residual monomer content is 0.1% or lower;
(B) 40 to 80% by weight of a base oil selected from the group consisting of API Group II oils, API Group III oils, API Group IV oils, and mixtures thereof; and
(C) 0 to 5% by weight of one or more additives.

The content of each component (A), (B) and (C) is based on the total weight of the lubricating composition. In a particular embodiment, the proportions of components (A), (B) and (C) add up to 100% by weight.

The content of each component (a) and (b) is based on the total composition of the polyalkyl acrylate. In a particular embodiment, the proportions of components (a) and (b) add up to 100% by weight.

In apolar formulations based on Group II, III and IV base oils and polyolefin thickeners, it is common practice to add a Group V base oil, such as esters or alkylated naphthalenes, in order to dissolve the additives. Due to the solvency provided by the highly polar polyacrylates of the present invention, no further compatibilizer is added to the formulations described in the present invention. The base oil to be used in the lubricating composition comprises an oil of lubricating viscosity. Such oils include natural and synthetic oils, oils derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and Ill are mineral oils which are classified by the amount of saturates and sulphur they contain and by their viscosity indices; Group IV are polyalphaolefins; and Group V are all others, including e.g. ester oils. The table below illustrates these API classifications.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate apolar base oils used to prepare a lubricating composition in accordance with the present invention is preferably in the range of 5 mm$^2$/s to 15 mm$^2$/s, more preferably in the range of 6 mm$^2$/s to 113 mm$^2$/s, and even more preferably in the range of 8 mm$^2$/s to 12 mm$^2$/s, determined to ASTM D445.

Particularly preferred lubricants of the present invention comprise at least one base oil selected from the group consisting of API Group II oils, API Group III oils, polyalphaolefins (PAO) and mixtures thereof.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

Especially for industrial gear oil formulations are used base oils of API Group II, III, IV or mixtures thereof.

The lubricating composition according to the invention may also contain, as component (C), further additives selected from the group consisting of pour point depressants, dispersants, defoamers, detergents, demulsifiers, antioxidants, antiwear additives, extreme pressure additives, friction modifiers, anticorrosion additives, dyes and mixtures thereof.

Preferred pour point depressants are, for example, selected from the group consisting of alkylated naphthalene and phenolic polymers, polyalkyl methacrylates, maleate copolymer esters and fumarate copolymer esters, which may conveniently be used as effective pour point depressants.

The lubricating oil composition may contain 0.1% by weight to 0.5% by weight of a pour point depressant. Preferably, not more than 0.3% by weight of a pour point depressant is used.

Appropriate dispersants include poly(isobutylene) derivatives, for example poly(isobutylene)succinimides (PIBSIs), including borated PIBSIs; and ethylene-propylene oligomers having N/O functionalities.

Suitable defoaming agents include, for example, silicone oils, fluorosilicone oils, and fluoroalkyl ethers.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Preferred demulsifiers include alkyleneoxide copolymers and (meth)acrylates including polar functions.

The suitable antioxidants include, for example, phenols, for example 2,6-di-tert-butylphenol (2,6-DTB), butylated hydroxytoluene (BHT), 2,6-di-tert-butyl-4-methylphenol, 4,4'-methylenebis(2,6-di-tert-butylphenol); aromatic amines, especially alkylated diphenylamines, N-phenyl-1-naphthylamine (PNA), polymeric 2,2,4-trimethyldihydroquinone (TMQ); compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

The preferred antiwear and extreme pressure additives include phosphorus compounds, for example trialkyl phosphates, triaryl phosphates, e.g. tricresyl phosphate, amine-neutralized mono- and dialkyl phosphates, ethoxylated mono- and dialkyl phosphates, phosphites, phosphonates, phosphines; compounds having sulfur and phosphorus, for example metal dithiophosphates, e.g. zinc di-$C_{3-12}$-alkyldithiophosphates (Zn DTPs), ammonium dialkyldithiophosphates, antimony dialkyldithiophosphates, molybdenum dialkyldithiophosphates, lead dialkyldithiophosphates, "OOS triesters"=reaction products of dithiophosphoric acid with activated double bonds from olefins, cyclopentadiene, norbornadiene, α-pinene, polybutene, acrylic esters, maleic esters, triphenyl phosphorothionate (TPPT); compounds having sulfur and nitrogen, for example zinc bis(amyldithiocarbamate) or methylenebis(di-n-butyl dithiocarbamate); sulfur compounds with elemental sulfur and $H_2S$ sulfurized hydrocarbons (diisobutylene, terpene); sulfurized glycerides and fatty acid esters; overbased sulfonates; chlorine compounds or solids, such as graphite or molybdenum disulfide.

Friction modifiers used may include mechanically active compounds, for example molybdenum disulfide, graphite (including fluorinated graphite), poly(trifluoroethylene), polyamide, polyimide; compounds that form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds that form polymer-like layers, for example ethoxylated dicarboxylic partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and combinations thereof with ZnDTPs, copper-containing organic compounds.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Dispersants (including borated dispersants) are preferably used in a concentration of 0% to 2% by weight, defoamers in a concentration of 10 to 2500 ppm, detergents in a concentration of 0.05% to 1% by weight, demulsifiers in a concentration of 0% to 0.1% by weight, antioxidants in a concentration of 0.5% to 1.5% by weight, antiwear and extreme pressure additives each in a concentration of 0.1% to 1% by weight, friction modifiers in a concentration of 0.05% to 2% by weight, anticorrosion additives in a concentration of 0.05% to 0.5% by weight, and dyes in a concentration of 0.01% to 1% by weight. The concentration is based in each case on the total weight of the lubricating oil composition.

Preferably, the total concentration of the one or more additives (C) in a lubricating oil composition is up to 5% by weight, more preferably 0.1% to 4% by weight, more preferably 0.5% to 3% by weight, based on the total weight of the lubricating oil composition.

A further fifth object of the present invention is directed to a lubricating composition, comprising:
(A) 20 to 60% by weight of poly-ethylhexyl acrylate, having a weight-average molecular weight is in the range of 10,000 to 20,000 g/mol and being characterized by a residual monomer content of 0.1% or lower;
(B) 40 to 80% by weight of a base oil selected from the group consisting of API Group II oils, API Group III oils, API Group IV oils, and mixtures thereof; and
(C) 0 to 5% by weight of one or more additives.

The content of each component (A), (B) and (C) is based on the total weight of the lubricating composition. In a particular embodiment, the proportions of components (A), (B) and (C) add up to 100% by weight.

A sixth object of the present invention is directed to the use of the above-described lubricating oil composition as industrial gear oil.

A further sixth object of the present invention is directed to a method of preparing a lubricating composition, the method comprising:
combining 20 to 60% by weight of at least one polyalkyl acrylate, comprising:
(a) 95 to 100% by weight of branched $C_{8-10}$-alkyl acrylates; and
(b) 0 to 5% by weight of $C_{1-20}$-alkyl (meth)acrylates,
characterized in that the weight-average molecular weight is in the range of 7,000 to 25,000 g/mol and the residual monomer content is 0.1% or lower, with
40 to 80% by weight of a base oil selected from the group consisting of API Group II oils, API Group III oils, API Group IV oils, and mixtures thereof, and
0 to 5% by weight of one or more additives.

A further sixth object of the present invention is directed to a method of lubricating an industrial gear, comprising the steps of:
(i) preparing a lubricating composition as described further above; and
(ii) applying the lubricating composition prepared under (i) to an industrial gear.

The polyalkyl acrylates as described further above are prepared in a special feed process. Control over absolute molecular weight and molecular weight distribution is of highest importance for the application as high viscosity base fluid. This can be conventionally achieved by addition of chain transfer agents or high radical initiator concentrations (see e.g. US 2013/0229016). The process described herein works without addition of a chain transfer agent and with a comparably small amount of initiator, relative to the obtained molecular weight.

A sixth object of the present invention is directed to a process for preparing the polyalkyl acrylates as described further above, the process comprising the steps of:
(i) charging a reaction vessel with a base oil;
(ii) heating the base oil of step (i) to a reaction temperature of 130° C. to 170° C.;
(iii) constantly feeding a mixture of branched $C_{8-10}$-alkyl acrylates and 0.1 to 1.2% of an initiator, based on the amount of branched $C_{8-10}$-alkyl acrylates, to the reaction vessel over a time of 120 to 240 minutes;
(iv) optionally stirring the reaction mixture obtained under step (iii) for another 50 to 90 minutes; and
(vi) cooling the reaction mixture obtained under step (iv) to an ambient temperature and obtaining the desired polyalkyl acrylate.

The base oil to be used in step (i) can be selected from the group consisting of API Group II oils, API Group III, API Group IV oils and mixtures thereof.

The concentration of the alkyl acrylates in the reaction mixture is 70 to 95% by weight, preferably 80 to 90% by weight. That means that the reaction mixture obtained under step (iii) contains 5 to 30% by weight, preferably 10 to 20% by weight of base oil and 70 to 95% by weight, preferably 80 to 90% by weight, of alkyl acrylates.

Usable initiators include azo initiators widely known in the technical field, such as AIBN and 1,1-azobiscyclohexanecarbonitrile, and also peroxy compounds such as methyl ethyl ketone peroxide, acetylacetone peroxide, dilauryl peroxide, tert-butyl per-2-ethyl hexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethyl hexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the aforementioned compounds with one another, and mixtures of the aforementioned compounds with unspecified compounds which can likewise form free radicals.

Preferred initiators are dicumylperoxide and tert-butyl peroxy-2-ethylhexanoate.

The invention has been further illustrated by the following non-limiting examples.

Experimental Part

Abbreviations

BV bulk viscosity
BV40 bulk viscosity@40° C.
BV100 bulk viscosity@100° C.
C600R Group II base oil from Chevron with a $KV_{100}$ of 12 cSt
DDM dodecyl mercaptane
EHA ethylhexyl acrylate, commercially available from Aldrich
HA hexyl acrylate
Hitec® 307 DI Package commercially available from Afton
IDA iso-decyl acrylate, commercially available from Aldrich
ITDA iso-tridecyl acrylate, commercially available from Aldrich
KV kinematic viscosity measured according to ASTM D445
$KV_{40}$ kinematic viscosity measured@40° C. to ASTM D445
$KV_{100}$ kinematic viscosity measured@100° C. to ASTM D445
$KV_{-10}$ kinematic viscosity measured@−10° C. to ASTM D445
LA lauryl acrylate, dodecyl acrylate, commercially available from Aldrich
$M_n$ number-average molecular weight
$M_w$ weight-average molecular weight
NB3080 Nexbase® 3080; Group III base oil from Neste with a $KV_{100}$ of 7.9 cSt
PAO6 polyalphaolefin base oil with a $KV_{100}$ of 6 cSt
PAO8 polyalphaolefin base oil with a $KV_{100}$ of 8 cSt
PDI polydispersity index
PHA propylheptyl acrylate, commercially available from Aldrich
PP pour point
VI viscosity index
VPL 1-180 VISCOPLEX® 1-180, pour point depressant commercially available from Evonik
VPL 14-520 VISCOPLEX® 14-520, defoamer commercially available from Evonik
Yubase 6 Group III base oil from SK Lubricants with a $KV_{100}$ of 6 cSt Test Methods The polyalkyl acrylates according to the present invention and the comparative examples were characterized with respect to their molecular weight, PDI and bulk viscosity at 40° C. and 100° C. (BV40 and BV100).

Molecular weights were determined by size exclusion chromatography (SEC) using commercially available polymethylmethacrylate (PMMA) standards. The determination is effected by gel permeation chromatography (GPC) to DIN 55672-1 with THF as eluent (flow rate: 1 mL/min; injected volume: 100 µl).

The lubricating oil compositions including the polyalkyl acrylates according to the present invention and comparative examples were characterized with respect to kinematic viscosity at −10° C. ($KV_{-10}$), 40° C. ($KV_{40}$) and 100° C. ($KV_{100}$) to ASTM D445, their viscosity index (VI) to ASTM D2270, Brookfield viscosity to ASTM D-2983 and their pour point to ASTM D5950.

The lubricating compositions were formulated to ISO viscosity grade 220 or 320, within a range of ±10%. The International Standards Organization Viscosity Grade, ISO VG, is recommended for industrial applications.

The reference temperature of 40° C. represents the operating temperature in machinery.

This ISO viscosity classification is consequently based on kinematic viscosity at 40° C. ($KV_{40}$).

| ISO Viscosity Grade | Midpoint Viscosity @40° C. [mm²/s] | Kinematic viscosity limits @40° C. [mm²/s] | |
|---|---|---|---|
| 220 | 220 | 198 | 242 |
| 320 | 320 | 288 | 352 |

Tapered roller bearing measurements to determine the shear loss were run (20 hours, 60° C., 5 kN and 1450 rpm) to CEC L-45-A-99 and corresponding kinematic viscosities measured at 40° C. ($KV_{40}$) and 100° C. ($KV_{100}$) to ASTM D-445

In connection with the evaluation of gear oil formulations, foam tests to ASTM D892 were run, air release was determined to DIN ISO 9120.

Synthesis 1: General Synthesis of Polyalkyl Acrylates Using a CTA Feed Process

A round-bottom flask equipped with a glass stir rod, nitrogen inlet, reflux condenser and thermometer was charged with 41.9 g NB3080. 200.0 g EHA, 6.0 g DDM, 0.5 g tert-butylper-2-ethylhexanoate and 4.5 g NB080 were added within 2 hours at 110° C. under nitrogen bubbling. Afterwards, 0.4 g tert-butylper-2-ethylhexanoate and 3.6 g NB3080 were fed to the reaction mixture over 1 hour.

Synthesis 2: General Synthesis of Polyalkyl Acrylates Using ATRP 1.88 g of pentamethyldiethylenetriamine, 0.78 g CuBr and 100.0 g of EHA were purged with nitrogen for 30 minutes and heated to 65° C. After addition of 2.12 g of ethylene bis(2-bromoisobutyrate) the reaction mixture was heated to 95° C. After 4 hours 1.10 g DDM were added. The mixture was stirred for 2 h, cooled to room temperature and purified by pressure filtration. After filtration, a clear and slightly yellow colored highly viscous liquid was obtained which was applied without further purification.

Synthesis 3: General Synthesis of Polyalkyl Acrylates Using the Novel Acrylate Process 0.85 g (0.5% by weight, based on the amount of EHA) of dicumylperoxide dissolved in 170.0 g of EHA was fed to 26.77 g of NB3080 under nitrogen at 150° C. over 3 hours. Optionally, after this time, the temperature of the mixture was lowered to 110° C. and 0.17 g of tert-butylper-2-ethylhexanoate (0.1% by weight, based on the amount of EHA) dissolved in 3.23 g of NB3080 was added. After stirring for another hour, the resulting clear polymer solution was cooled down and used in subsequent experiments without further purification.

Synthesis 4: General Synthesis of Polyalkyl Methacrylates

A round-bottom flask equipped with a glass stir rod, nitrogen inlet, reflux condenser and thermometer was charged with 284.4 g EHMA and 8.9 g DDM. 0.75 g tert-butylper-2-ethylhexanoate and 15.0 g EHMA were added within 3 hours at 110° C. under nitrogen bubbling. After holding the temperature for 1 hour, 0.6 g tert-butylper-2-ethylhexanoate were added. After waiting for another hour, a final shot of 0.6 g tert-butylper-2-ethylhexanoate was added and the solution as stirred at 110° C. for one hour. The resulting clear and highly viscous liquid was used without further purification.

TABLE 1

Initiators used in the different syntheses.

| Initiator | Name |
|---|---|
| A | tert-butylper-2-ethylhexanoate |
| B | dicumylperoxide |
| C | dicetyl peroxydicarbonate |
| D | tert-butylperbenzoate |
| E | 1,1-di-tert-butylperoxy-3,3,5-trimethyl cyclohexane |

All initiators are commercially available. Diacetyl peroxydicarbonate is commercially available from AkzoNobel.

The compositions of reaction mixtures used to prepare the working examples and comparative examples are shown in the following Table 2. The amounts of monomer and base oil do always add up to 100%. The amounts of initiator and DDM are given relative to the total amount of monomer.

TABLE 2

Compositions of reaction mixtures used to prepare the working examples and comparative examples.

| | | | Initiator | | | | | |
|---|---|---|---|---|---|---|---|---|
| Example # | Monomer | Base Oil | A [%] | B [%] | C [%] | D [%] | E [%] | DDM [%] |
| 1 | EHA | NB3080 | 0.25 | — | — | — | — | 3.00 |
| 2 | EHA | NB3080 | 0.25 | — | — | — | — | 1.90 |
| 3 | EHA | NB3080 | 0.50 | — | — | — | — | 1.90 |
| 4 | EHA | NB3080 | — | — | — | — | — | — |
| 5 | EHA | NB3080 | 1.00 | — | — | — | — | — |
| 6 | EHA | NB3080 | — | 1.25 | — | — | — | — |
| 7 | EHA | NB3080 | — | — | 2.64 | — | — | — |
| 8 | EHA | NB3080 | — | 0.90 | — | — | — | — |
| 9 | EHA | NB3080 | — | 0.90 | — | — | — | — |
| 10 | EHA | NB3080 | — | 0.90 | — | — | — | — |
| 11 | EHA | NB3080 | — | 0.90 | — | — | — | — |
| 12 | EHA | NB3080 | — | 0.90 | — | — | — | — |
| 13 | EHA | NB3080 | — | 0.90 | — | — | — | — |
| 14 | EHA | NB3080 | — | 0.50 | — | — | — | — |
| 15 | EHA | NB3080 | — | 0.90 | — | — | — | — |
| 16 | EHA | NB3080 | — | 0.90 | — | — | — | — |
| 17 | EHA | NB3080 | — | 0.50 | — | — | — | — |
| 18 | EHA | NB3080 | — | 0.30 | — | — | — | — |
| 19 | EHA | NB3080 | — | 0.20 | — | — | — | — |
| 20 | EHA | NB3080 | — | 0.05 | — | — | — | — |

TABLE 2-continued

Compositions of reaction mixtures used to prepare the working examples and comparative examples.

| | | | Initiator | | | | | |
|---|---|---|---|---|---|---|---|---|
| Example # | Monomer | Base Oil | A [%] | B [%] | C [%] | D [%] | E [%] | DDM [%] |
| 21 | EHA | NB3080 | — | 0.50 | — | — | — | — |
| 22 | HA | NB3080 | — | 0.50 | — | — | — | — |
| 23 | IDA | NB3080 | — | 0.50 | — | — | — | — |
| 24 | LA | NB3080 | — | 0.50 | — | — | — | — |
| 25 | HA | NB3080 | — | 0.50 | — | — | — | — |
| 26 | ITDA | NB3080 | — | 0.50 | — | — | — | — |
| 27 | EHA | C600R | — | 0.50 | — | — | — | — |
| 28 | EHA | C600R | — | 0.50 | — | — | — | — |
| 29 | EHA | C600R | — | 0.50 | — | — | — | — |
| 30 | EHA | C600R | — | 0.10 | — | — | — | — |
| 31 | EHA | C600R | — | 0.20 | — | — | — | — |
| 32 | EHA | C600R | — | 0.30 | — | — | — | — |
| 33 | EHA | C600R | — | 0.40 | — | — | — | — |
| 34 | EHA | Yubase 6 | — | 0.50 | — | — | — | — |
| 35 | EHA | PAO 8 | — | 0.50 | — | — | — | — |
| 36 | EHA | PAO 8 | — | 0.50 | — | — | — | — |
| 37 | PHA | PAO 8 | — | 0.50 | — | — | — | — |
| 38 | PHA | PAO 8 | — | 0.50 | — | — | — | — |
| 39 | PHA | PAO 8 | — | 0.20 | — | — | — | — |
| 40 | PHA | PAO 8 | — | 0.10 | — | — | — | — |
| 41 | EHA | PAO 8 | — | 0.50 | — | — | — | — |
| 42 | EHA | PAO 8 | — | 0.90 | — | — | — | — |
| 43 | EHA | PAO 8 | — | 1.30 | — | — | — | — |
| 44 | EHA | PAO 8 | — | — | — | 0.50 | — | — |
| 45 | EHA | PAO 8 | — | — | — | — | 0.50 | — |
| 46 | EHMA | — | 0.25 | — | — | — | — | 2.95 |

Conclusions:

Examples 1 to 4 were prepared according to known processes. Although temperature control and economics were poor, the targeted polymers could be prepared. Examples 1 to 4 are encompassed by the description of the present invention and show good performance as base oils in lubricant compositions (see results presented further down in Table 5). Aside from this, Examples 1 to 3 contain a substantial amount of sulphur which is considered to be detrimental to the compatibility with certain metals and rubber seals. Examples 1 to 3 do further contain high residual monomer contents (see Table 4 further down).

To obtain control over temperature, a monomer feed process was used. Attempts to adjust the molecular weight of the polymers to the targeted range below 25,000 g/mol using sulfur-containing chain transfer agents yielded no satisfying residual monomer levels.

Aside from this, the required amounts of chain transfer agent to be used in this process was quite significant, leading to unwanted high sulfur levels in the product (Examples 1 to 3; 1.90 and 3.00% of DDM are used, respectively). Despite their positive effects on oxidation and wear performance, sulfur components are known to cause problems with yellow metals and rubber sealings (see L. R. Rudnick, Lubricant Additives: Chemistry and Applications, 3rd Edition, 2017, p.197ff).

Examples 5, 7, 20, 22, 30, 44 and 45 are comparative examples as the molecular weight Mw is outside the described range of 7000 to 25,000 g/mol.

Examples 6, 8-19, 21, 23, 27-29 and 31-43 are in accordance with the present invention.

Examples 22, 24-26 and 46 are comparative examples as they are prepared from monomers that are not encompassed by claim 1 the description of the present invention.

The following Table 3 provides details regarding the preparation method used to synthesize working examples and comparative examples.

TABLE 3

Process details.

| Example # | Process | Feed Time [h] | Temperature [° C.] | Concentration [%] |
|---|---|---|---|---|
| 1 | Synthesis 1 | 2 | 110 | 80 |
| 2 | Synthesis 1 | 5 | 110 | 60 |
| 3 | Synthesis 1 | 5 | 110 | 60 |
| 4 | Synthesis 2 | — | — | 50 |
| 5*) | Synthesis 3 | 4 | 110 | 60 |
| 6 | Synthesis 3 | 4 | 160 | 60 |
| 7*) | Synthesis 3 | 4 | 84 | 60 |
| 8 | Synthesis 3 | 4 | 160 | 60 |
| 9 | Synthesis 3 | 4 | 160 | 80 |
| 10 | Synthesis 3 | 4 | 160 | 85 |
| 11 | Synthesis 3 | 3 | 160 | 85 |
| 12 | Synthesis 3 | 3 | 150 | 85 |
| 13 | Synthesis 3 | 3 | 150 | 85 |
| 14 | Synthesis 3 | 3 | 150 | 90 |
| 15 | Synthesis 3 | 3 | 150 | 90 |
| 16 | Synthesis 3 | 3 | 150 | 85 |
| 17 | Synthesis 3 | 2 | 150 | 85 |
| 18 | Synthesis 3 | 3 | 150 | 85 |
| 19 | Synthesis 3 | 3 | 150 | 85 |
| 20*) | Synthesis 3 | 3 | 150 | 85 |
| 21 | Synthesis 3 | 3 | 150 | 85 |
| 22*) | Synthesis 3 | 3 | 150 | 85 |
| 23 | Synthesis 3 | 3 | 150 | 75 |
| 24*) | Synthesis 3 | 3 | 150 | 70 |
| 25*) | Synthesis 3 | 3 | 150 | 50 |
| 26*) | Synthesis 3 | 3 | 150 | 75 |
| 27 | Synthesis 3 | 3 | 150 | 85 |
| 28 | Synthesis 3 | 3 | 150 | 80 |
| 29 | Synthesis 3 | 3 | 150 | 90 |
| 30*) | Synthesis 3 | 3 | 150 | 80 |
| 31 | Synthesis 3 | 3 | 150 | 90 |

TABLE 3-continued

Process details.

| Example # | Process | Feed Time [h] | Temperature [° C.] | Concentration [%] |
|---|---|---|---|---|
| 32 | Synthesis 3 | 3 | 150 | 90 |
| 33 | Synthesis 3 | 3 | 150 | 90 |
| 34 | Synthesis 3 | 3 | 150 | 85 |
| 35 | Synthesis 3 | 3 | 150 | 85 |
| 36 | Synthesis 3 | 3 | 150 | 85 |
| 37 | Synthesis 3 | 3 | 150 | 85 |
| 38 | Synthesis 3 | 3 | 150 | 80 |
| 39 | Synthesis 3 | 3 | 150 | 90 |
| 40 | Synthesis 3 | 3 | 150 | 90 |
| 41 | Synthesis 3 | 3 | 150 | 80 |
| 42 | Synthesis 3 | 3 | 150 | 85 |
| 43 | Synthesis 3 | 3 | 150 | 85 |
| 44*) | Synthesis 3 | 3 | 140 | 85 |
| 45*) | Synthesis 3 | 3 | 125 | 85 |
| 46*) | Synthesis 4 | 3 | 110 | 100 |

*)comparative example

First attempts to prepare the targeted polyacrylates in a batch process similar to poly(EHMA) (Synthesis 4, Example 46) failed due to poor temperature control. Good results were obtained by using the ATRP process (Synthesis 2, Example 4), but due to the poor economics a new process had to be developed.

A novel feed process without chain transfer agent was developed which provided polymers with very low residual monomer content (Synthesis 3). Low molecular weights are accessible with good conversion and narrow molecular weight distributions. The process works well, especially at elevated temperatures which are beneficial for reaching high temperatures and good conversions (see e.g. Examples 5, 6, 7, 41, 44 and 45).

Aside from temperature that needs to be adjusted to the respective initiator system, the molecular weight can be controlled by several measures. Surprisingly low is the influence of the amount of initiator. Very small amounts of initiator result in an increase of the molecular weight, but around 0.5 wt.% variations of the initiator content result in insignificant changes in the molecular weight (Examples 16-20, 29, 31, 32, 33, 42 and 43).

Feed times have also just minor influence in a reasonable window of 2-4 hours (see Examples 10, 11, 17 and 21).

The molecular weight can be also influenced by the amount of base oil in the heel at the beginning of the reaction (see Examples 8-10, 22, 25 and 27-29).

The characteristics of the polyalkyl acrylates prepared in the course of the present invention are disclosed in the following Table 4.

TABLE 4

Characteristics of the polyalkyl acrylates prepared according to the present invention.

| Example # | $M_w$ [g/mol] | $M_n$ [g/mol] | PDI | ReMo [%] | BV40 [mm²/s] | BV100 [mm²/s] | VI |
|---|---|---|---|---|---|---|---|
| 1*) | 13,000 | 7,060 | 1.84 | 0.24 | 1141 | 104.4 | 185 |
| 2*) | 16,500 | 8,440 | 1.95 | 0.54 | 499 | 54.4 | 175 |
| 3*) | 15,600 | 8,010 | 1.95 | 0.49 | 480 | 52.4 | 173 |
| 4*) | 14,400 | 8,460 | 1.70 | 0.01 | 323 | 38.3 | 165 |
| 5*) | 34,400 | 11,300 | 3.04 | 0.05 | 1076 | 108.1 | 197 |
| 6 | 7,590 | 4,730 | 1.60 | 0.04 | 294 | 31.9 | 149 |
| 7*) | 52,200 | 15,700 | 3.32 | 0.18 | 1472 | 148.6 | 214 |
| 8 | 7,130 | 4,650 | 1.53 | 0.03 | 287 | 30.8 | 147 |
| 9 | 10,500 | 5,560 | 1.89 | 0.01 | 983 | 85.4 | 170 |
| 10 | 12,600 | 5,960 | 2.11 | 0.01 | 1577 | 126.3 | 180 |
| 11 | 11,600 | 5,750 | 2.02 | 0.02 | 1329 | 108.6 | 175 |
| 12 | 16,700 | 7,060 | 2.37 | 0.01 | 2191 | 172.1 | 194 |
| 13 | 13,900 | 6,430 | 2.16 | <0.01 | 1798 | 144.5 | 187 |
| 14 | 18,600 | 7,400 | 2.51 | <0.01 | 3457 | 252.7 | 208 |
| 15 | 18,700 | 7,270 | 2.57 | 0.09 | 3348 | 244.9 | 206 |
| 16 | 15,100 | 6,720 | 2.25 | 0.01 | 1936 | 153.7 | 189 |
| 17 | 15,200 | 7,030 | 2.16 | <0.01 | 2078 | 162.0 | 190 |
| 18 | 16,100 | 7,240 | 2.22 | 0.01 | 2155 | 170.0 | 194 |
| 19 | 17,200 | 7,500 | 2.29 | 0.03 | 2311 | 183.0 | 198 |
| 20*) | 30,900 | 10,300 | 3.00 | 0.03 | 4360 | 339.2 | 231 |
| 21 | 15,200 | 7,190 | 2.11 | 0.06 | 2131 | 168.6 | 194 |
| 22*) | 53,600 | 11,800 | 4.54 | 0.10 | 3446 | 318.3 | 247 |
| 23 | 15,400 | 7,490 | 2.06 | — | 975 | 82.9 | 166 |
| 24*) | 15,600 | 8,530 | 1.83 | — | 314 | 43.0 | 192 |
| 25*) | 14,800 | 7,570 | 1.96 | — | 61 | 9.6 | 138 |
| 26*) | 14,700 | 7,270 | 2.02 | — | 1320 | 95.9 | 157 |
| 27 | 16,300 | 7,470 | 2.18 | 0.02 | 2723 | 203.8 | 198 |
| 28 | 13,700 | 6,930 | 1.98 | 0.06 | 1872 | 138.2 | 176 |
| 29 | 18,800 | 7,670 | 2.45 | 0.05 | 4441 | 305.1 | 212 |
| 30*) | 25,100 | 9,830 | 2.55 | — | 6444 | 434.1 | 231 |
| 31 | 23,300 | 9,320 | 2.50 | — | — | — | — |
| 32 | 20,600 | 8,640 | 2.38 | — | — | — | — |
| 33 | 20,800 | 8,900 | 2.34 | — | — | — | — |
| 34 | 16,100 | 7,270 | 2.21 | 0.02 | 2165 | 172.0 | 195 |
| 35 | 18,600 | 8,380 | 2.22 | <0.01 | 2771 | 216.1 | 206 |
| 36 | 17,300 | 8,060 | 2.15 | 0.04 | 2537 | 200.4 | 203 |
| 37 | 14,100 | 7,270 | 1.94 | <0.01 | 1671 | 145.8 | 197 |
| 38 | 11,500 | 6,560 | 1.75 | 0.09 0.02 | 1016 | 90.6 | 175 |
| 39 | 15,400 | 7,770 | 1.98 | 0.05 | 2556 | 201.0 | 203 |
| 40 | 17,800 | 8,800 | 2.02 | — | — | — | — |
| 41 | 14,900 | 7,600 | 1.96 | 0.04 | 1645 | 138.0 | 190 |
| 42 | 20,200 | 8,530 | 2.37 | — | — | 229.0 | — |
| 43 | 20,200 | 8,190 | 2.47 | — | 2704 | 221.8 | 213 |
| 44 | 30,900 | 10,200 | 3.03 | <0.01 | 4587 | 345.7 | 229 |
| 45*) | 96,700 | 16,400 | 5.90 | <0.01 | 13648 | 993.3 | 290 |
| 46*) | 14,800 | 7,990 | 1.85 | — | — | — | — |

*)comparative example

It can be seen that all polymers prepared by Synthesis 3 have residual monomer contents of 0.1% or even well below. All working examples which are in accordance with the present invention have bulk viscosities (BV40) well above 320 mm²/s, i.e. can be easily formulated to ISO viscosity grade 320.

It is further visible that polymers having a weight-average molecular weight of around 7,000 g/mol show borderline bulk viscosities at 40° C. (see Examples 6 and 8), i.e. they can only be formulated to an ISO viscosity grade of 220 or below.

Different acrylate monomers were used to generate homopolymers for the evaluation as high viscosity base fluids. Hexyl acrylate has proven to be completely unsuitable as the bulk viscosity of the synthesized polymers was too low to be of any use (Example 25). Even with a massive boost in molecular weight, high treat rate and the expected lack of shear stability are so poor that no further investigation was done (Example 22).

Lubricating Compositions

To proof the performance of the acrylate polymers prepared in accordance with the present invention, lubricating compositions were prepared by using the acrylate polymers as a base fluid and mixing them together with other base oil(s) to reach ISO viscosity grades of 220 and 320. The results for typical formulation parameters like KV100, VI, PP and Brookfield viscosity are presented in the following Tables 5 to 9.

While acrylates and methacrylates are often regarded interchangeable in the field of VI improvers, the results presented in the present invention clearly show a difference when using them as high viscosity base stocks. While the EHMA homopolymer (Example 46) showed very poor miscibility with Nexbase 3080 (an API Group III oil), and phase separation was observed, no such issues were found for EHA homopolymers in any of the used solvents and concentrations.

Poly(lauryl acrylate, LA) (Example 24) showed poor performance in treat rate and low temperature properties in a fully formulated ISO 320 formulation. Poly(isodecylacrylate) (Example 23) and poly(isotridecylacrylate) (Example 26) both showed insufficient performance at low temperatures compared to poly(EHA).

Improved low temperature performance was observed for poly(propylheptylacrylate) (Examples 37-40) at the cost of a slightly increased treat rate compared to poly(EHA).

Due to the high conversion of the monomers and as no other volatile components are used in the process such as chain transfer agents, the flashpoints of the acrylate polymers are very high. Data are given for Example 27 and the measured flashpoint (COC method ASTM D92) was the same as specified for the dilution oil Chevron 600R used in the process (Example 27).

For the use of Example 30, precipitation was observed in an ISO 220 formulation in API Group III base oil. As this was not observed for other samples at lower molecular weight, it can be concluded that the in all other experiments observed perfect oil compatibility even in extremely poor solvency base oils is limited to molecular weights below 25,000 g/mol for EHA homopolymers.

TABLE 5

Formulation data of compositions A formulated to ISO 320 ($KV_{40}$ = 320 ± 10%)

| Composition | A-1 | A-2 | A-3 | A-4 | A-5 | A-6 | A-7 | A-8 | A-9 |
|---|---|---|---|---|---|---|---|---|---|
| Example 1 [%] | 65.70 | — | — | — | — | — | — | — | — |
| Example 2 [%] | — | 80.90 | — | — | — | — | — | — | — |
| Example 3 [%] | — | — | 81.80 | — | — | — | — | — | — |
| Example 4 [%] | — | — | — | 46.9 | — | — | — | — | — |
| Example 9 [%] | — | — | — | — | 69.00 | — | — | — | — |
| Example 10 [%] | — | — | — | — | — | 63.00 | — | — | — |
| Example 12 [%] | — | — | — | — | — | — | 58.00 | — | — |
| Example 13 [%] | — | — | — | — | — | — | — | 60.20 | — |
| Example 21 [%] | — | — | — | — | — | — | — | — | 58.00 |
| Viscoplex 1-180 [%] | 0.70 | 0.70 | 0.70 | 0.70 | 0.70 | 0.70 | 0.70 | 0.70 | 0.70 |
| Hitec 307 [%] | 2.65 | 2.65 | 2.65 | 2.65 | 2.65 | 2.65 | 2.65 | 2.65 | 2.65 |
| NB3080 [%] | 30.95 | 15.75 | 14.85 | 49.75 | 27.65 | 33.65 | 38.65 | 36.45 | 38.65 |
| Blend Total [%] | 100.0 | 100.0 | 100.00 | 100.00 | 100.00 | 100.00 | 100.00 | 100.00 | 100.00 |
| Polymer content [%] | 52.6 | 48.5 | 49.1 | 46.9 | 55.2 | 53.55 | 49.3 | 51.8 | 49.3 |
| $KV_{40}$ [mm²/s] | 326.1 | 322.9 | 319.4 | 317.8 | 321.2 | 322.2 | 322.0 | 320.9 | 317.1 |
| $KV_{100}$ [mm²/s] | 37.45 | 37.71 | 37.03 | 36.73 | 35.27 | 35.71 | 36.65 | 36.07 | 36.21 |
| VI | 164 | 167 | 165 | 164 | 156 | 157 | 162 | 159 | 162 |
| $KV_{-10}$ [mm²/s] | 14,020 | 14,270 | 14,618 | | 14,828 | 14,913 | 14,661 | 14,713 | |
| Brookfield (Air) [mPas] | 184,000 188,000 | 510,000 498,000 | 244,000 240,000 | | 140,000 140,000 | 152,000 152,000 | 216,000 200,000 | 160,000 152,000 | |
| PP [° C.] | −33 | −36 | −30 | | −39 | −33 | −36 | −33 | |
| KRL @20 hours | | | | | | | | | |
| $KV_{40}$ [mm²/s] | 320.5 | 314.7 | | | | | | | 317.5 |
| $KV_{100}$ [mm²/s] | 36.78 | 36.74 | | | | | | | 35.93 |
| shear loss @100° C. [%] | 1.8 | 2.6 | | | | | | | 0.8 |
| RL 209 reference oil value [%] | 9.9 | 9.9 | | | | | | | 10.2 |

TABLE 6

Formulation data of compositions A formulated to ISO 320 ($KV_{40}$ = 320 ± 10%)

| Composition | A-10 | A-11 | A-12 | A-13 | A-14 | A-15 | A-16 | A-17 |
|---|---|---|---|---|---|---|---|---|
| Example 23 [%] | 67.50 | — | — | — | — | — | — | — |
| Example 24 [%] | — | 96.65 | — | — | — | — | — | — |
| Example 26 [%] | — | — | 62.00 | — | — | — | — | — |
| Example 35 [%] | — | — | — | 54.70 | — | — | — | — |
| Example 36 [%] | — | — | — | — | 56.00 | — | — | — |
| Example 37 [%] | — | — | — | — | — | 62.40 | — | — |
| Example 41 [%] | — | — | — | — | — | — | 61.20 | — |
| Example 46 [%] | — | — | — | — | — | — | — | 30.55 |
| Viscoplex 1-180 [%] | 0.70 | 0.70 | 0.70 | — | — | — | — | 0.70 |
| Hitec 307 [%] | 2.65 | 2.65 | 2.65 | 2.65 | 2.65 | 2.65 | 2.65 | 2.65 |
| NB3080 [%] | 29.15 | — | 34.65 | — | — | — | — | 66.10 |
| PAO 8 | — | — | — | 42.65 | 41.35 | 34.95 | 36.15 | — |
| Blend Total [%] | 100.0 | 100.00 | 100.00 | 100.00 | 100.00 | 100.00 | 100.00 | 100.00 |
| Polymer content [%] | 50.63 | 67.66 | 46.50 | 46.50 | 47.60 | 53.04 | 48.96 | 30.55 |
| $KV_{40}$ | 314.5 | 315.5 | 313.6 | 325.3 | 325.1 | 328.1 | 323.2 | 309.8 |

TABLE 6-continued

Formulation data of compositions A formulated to ISO 320 (KV$_{40}$ = 320 ± 10%)

| Composition | A-10 | A-11 | A-12 | A-13 | A-14 | A-15 | A-16 | A-17 |
|---|---|---|---|---|---|---|---|---|
| [mm$^2$/s] | | | | | | | | |
| KV$_{100}$ | 35.20 | 42.94 | 33.06 | 38.02 | 37.86 | 38.13 | 37.09 | 31.54 |
| [mm$^2$/s] | | | | | | | | |
| VI | 158 | 193 | 147 | 167 | 166 | 166 | 163 | 141 |
| KV$_{-10}$ | 15,695 | solid | 16,180 | | | | | solid |
| [mm$^2$/s] | | | | | | | | |
| Brookfield (Air) | 220,000 | solid | 200,000 | 108,000 | 94,000 | 82,000 | 110,000 | solid |
| [mPas] | 216,000 | solid | 212,000 | 112,000 | 96,000 | 81,000 | 106,000 | solid |
| PP [° C.] | −39 | −6 | −36 | −36 | −39 | −45 | −36 | ??? |
| KRL @20 hours | | | | | | | | |
| KV$_{40}$ | | | | 315.3 | 317.0 | 324.5 | 311.0 | |
| [mm$^2$/s] | | | | | | | | |
| KV$_{100}$ | | | | 36.86 | 36.79 | 37.69 | 35.76 | |
| [mm$^2$/s] | | | | | | | | |
| shear loss @100° C. [%] | | | | 3.1 | 2.8 | 1.2 | 3.6 | |
| RL 209 reference oil value [%] | | | | 9.7 | 9.7 | 9.7 | 8.3 | |

TABLE 7

Formulation data of compositions A formulated to ISO 320 (KV$_{40}$ = 320 ± 10%)

| Composition | A-18 | A-19 | A-20 | A-21 | A-22 | A-23 | A-24 | A-25 | A-26 | A-27 |
|---|---|---|---|---|---|---|---|---|---|---|
| Example 34 [%] | 57.80 | 61.00 | 62.70 | — | — | — | — | — | — | — |
| Example 27 [%] | — | — | — | 42.0 | — | — | — | — | — | — |
| Example 35 [%] | — | — | — | — | 54.70 | — | — | — | — | — |
| Example 36 [%] | — | — | — | — | — | 56.00 | — | — | — | — |
| Example 37 [%] | — | — | — | — | — | — | 62.40 | — | — | — |
| Example 39 [%] | — | — | — | — | — | — | — | 57.60 | — | — |
| Example 40 [%] | — | — | — | — | — | — | — | — | 54.70 | — |
| Example 41 [%] | — | — | — | — | — | — | — | — | — | 61.20 |
| Viscoplex 1-180 [%] | 0.70 | 0.70 | — | 0.80 | — | — | — | — | — | — |
| Hitec 307 [%] | 2.65 | 2.65 | 2.65 | 2.65 | 2.65 | 2.65 | 2.65 | 2.65 | 2.65 | 2.65 |
| Chevron 600R [%] | — | — | — | 54.50 | — | — | — | — | — | — |
| NB3080 [%] | 38.85 | — | — | — | — | — | — | — | — | — |
| Yubase 6 [%] | — | 35.65 | — | — | — | — | — | — | — | — |
| PAO 6 [%] | — | — | 34.65 | — | — | — | — | — | — | — |
| PAO 8 [%] | — | — | — | — | 42.65 | 41.35 | 34.95 | 39.75 | 42.65 | 36.15 |
| Blend Total [%] | 100.0 | 100.0 | 100.00 | 100.00 | 100.00 | 100.00 | 100.00 | 100.00 | 100.00 | 100.00 |
| Polymer content [%] | 49.13 | 51.85 | 53.30 | 35.70 | 46.50 | 47.60 | 53.04 | 51.84 | 49.23 | 48.96 |
| top treat Viscoplex 14-520 [ppm] | 2000 | 2000 | 2000 | — | — | — | — | — | — | — |
| KV$_{40}$ [mm$^2$/s] | 324.7 | 324.6 | 322.7 | 319.2 | 325.3 | 325.1 | 328.1 | 323.7 | 317.0 | 323.2 |
| KV$_{100}$ [mm$^2$/s] | 37.37 | 37.89 | 38.31 | 32.37 | 38.02 | 37.86 | 38.13 | 38.06 | 38.05 | 37.09 |
| VI | 164 | 167 | 169 | 142 | 167 | 166 | 166 | 168 | 170 | 163 |
| Brookfield (Air) [mPas] | | 128,000 | 95,000 | 143,970 | 108,000 | 94,000 | 82,000 | 80,000 | 74,000 | 110,000 |
| | | 130,000 | 96,000 | | 112,000 | 96,000 | 81,000 | 80,000 | 72,000 | 106,000 |
| PP [° C.] | −36 | −36 | −39 | −33 | −36 | −39 | −45 | −48 | −45 | −36 |
| KRL @20 hours | | | | | | | | | | |
| KV$_{40}$ [mm$^2$/s] | 310.8 | 309.6 | 313.3 | 309.3 | 315.3 | 317.0 | 324.5 | | | 311.0 |
| KV$_{100}$ [mm$^2$/s] | 35.69 | 36.13 | 37.21 | 31.69 | 36.86 | 36.79 | 37.69 | | | 35.76 |
| shear loss @100° C. [%] | 4.5 | 4.6 | 2.9 | 2.1 | 3.1 | 2.8 | 1.2 | | | 3.6 |
| RL 209 reference oil value [%] | 10.1 | 10.1 | 10.1 | | 9.7 | 9.7 | 9.7 | | | 8.3 |

TABLE 7-continued

Formulation data of compositions A formulated to ISO 320 (KV$_{40}$ = 320 ± 10%)

| Composition | A-18 | A-19 | A-20 | A-21 | A-22 | A-23 | A-24 | A-25 | A-26 | A-27 |
|---|---|---|---|---|---|---|---|---|---|---|
| water content Karl Fischer [%] | 0.02 | 0.02 | 0.02 | | | | | | | |
| flash point [° C.] | 238 | 232 | 234 | | | | | | | |

For ISO 320 formulations, the data disclosed in Tables 5 to 6 show that for EHA and PHA polymers the required polymer content is 40 to 60% by weight. The polymers in accordance with the present invention show good solubility in the used base oils (i.e. Group III and IV oils as well as mixtures thereof) at all temperatures down to the PP (pour point) of the formulation.

The polymers of the present invention further show good low temperature behavior (see KV$_{-10}$ and BF$_{-26}$ values) and pour points what is remarkable for polymers having such high polarities.

The formulations comprising the polymers of the present invention have high VIs of around 160. This means that the KV$_{100}$ of the formulations is higher than the KV$_{100}$ of a regular mineral oil-based ISO 460 formulation. This allows the combination of high protection of the equipment and good flow properties at low temperatures.

Formulation A17 provides the surprising result that the EHMA polymer is different to the EHA polymers; the EHMA polymer is not compatible with the base oils at low temperatures even though the treat rate is substantially lower. Such a difference between acrylates and methacrylates has not been reported before as oil soluble VI improvers are not pushed that hard to the solubility limits. The combination of high treat rates and a rather thick apolar base oil with poor solvency is a special case not covered by the state of the art so far.

When comparing different acrylate homopolymers, poly-LA (A-11) is obviously unsuitable as the formulation becomes solid at temperatures above −10° C. While poly-IDA performs only slightly inferior in terms of VI and low-temperature properties compared to EHA and PHA polymers the gap is larger for poly-ITDA. Also, the polarity of poly-ITDA is lower which does not make it a promising candidate compared to the other options.

TABLE 8

Foam test

| Composition | | A-18 | A-19 | A-20 |
|---|---|---|---|---|
| sequence I | Foam after Blowing Period @24° C. [mL] | 0 | 0 | 0 |
| sequence I | Foam after 10 min @24° C. [mL] | 0 | 0 | 0 |
| sequence I | Collapse time @24° C. [s] | 0 | 0 | 0 |
| sequence II | Foam after Blowing Period @94° C. [mL] | 210 | 40 | 50 |
| sequence II | Foam after 10 min @94° C. [mL] | 0 | 0 | 0 |
| sequence II | Collapse time @94° C. [s] | 334 | 129 | 134 |
| sequence III | Foam after Blowing Period @24° C. [mL] | 0 | 0 | 0 |
| sequence III | Foam after 10 min @24° C. [mL] | 0 | 0 | 0 |
| sequence III | Collapse time @24° C. [s] | 0 | 0 | 0 |

Due to the high polarity of some of the polymer blocks an impact on performance tests involving interfaces was expected. For the air release and foam tests no strong effect was observed.

Filtration of the fluid is no problem at all which confirms the visual observation that the polymer and the additives are completely dissolved in the oil phase.

TABLE 9

Formulation data of compositions B formulated to ISO 220 (KV$_{40}$ = 220 ± 10%)

| Composition | B-1 | B-2 | B-3 | B-4 | B-5 | B-6 |
|---|---|---|---|---|---|---|
| Example 28 [%] | 35.00 | — | — | — | — | — |
| Example 29 [%] | — | 28.00 | — | — | — | — |
| Example 30 [%] | — | — | 25.00 | — | — | — |
| Example 32 [%] | — | — | — | 27.10 | — | — |
| Example 33 [%] | — | — | — | — | 27.10 | — |
| Example 31 [%] | — | — | — | — | — | — |
| Hitec 307 [%] | 2.65 | 2.65 | 2.65 | 2.65 | 2.65 | 2.65 |
| Chevron 600R [%] | 62.35 | 69.35 | 72.35 | 70.25 | 70.25 | — |
| Blend Total [%] | 100.0 | 100.0 | 100.00 | 100.00 | 100.00 | 100.00 |
| Polymer content [%] | 28.00 | 25.20 | 20.00 | 24.39 | 24.39 | — |
| KV$_{40}$ [mm$^2$/s] | 218.7 | 217.9 | 219.8 | 220.9 | 219.8 | — |
| KV$_{100}$ [mm$^2$/s] | 23.51 | 23.67 | 24.14 | 24.00 | 23.93 | — |
| VI | 133 | 134 | 137 | 135 | 136 | — |
| KRL @20 hours | | | | | | |
| KV$_{40}$ [mm$^2$/s] | 216.5 | 209.2 | | | | |
| KV$_{100}$ [mm$^2$/s] | 23.23 | 22.80 | | | | |

TABLE 9-continued

Formulation data of compositions B formulated to ISO 220 (KV$_{40}$ = 220 ± 10%)

| Composition | B-1 | B-2 | B-3 | B-4 | B-5 | B-6 |
|---|---|---|---|---|---|---|
| shear loss @100° C. [%] | 1.2 | 3.7 | | | | |
| RL209 shear loss @100° C. [%] | 10.1 | 10.1 | | | | |

For ISO 220 formulations, the data disclosed in Table 9 show that the required minimum polymer content is about 20% by weight. The polymers in accordance with the present invention show good solubility in the used base oils (i.e. Group III and IV oils as well as mixtures thereof) at all temperatures down to the pour point of the formulation. The resulting formulations have high VIs of around 130.

Different to the previously described formulations, the ISO220 formulations in Table 9 are more focused on formulation cost optimization rather than performance. For this reason, the treat rate of the acrylate polymers was minimized by choosing the lower viscosity grade and a Group II base fluid. The Group II base fluid does not only offer an economic advantage due to the simpler refinery process, it also has a higher viscosity than Group III and IV base fluids used in the previous examples which allows the reduction of the polymer treat rate below 30% by weight while maintaining excellent shear stability.

At such low treat rates, the positive influence on the VI is less pronounced, but still quite substantial. Not visible in the provided data, but apparent during formulation and investigation of the formulations is that the function of the inventive polymers as compatibilizer between additives and apolar base oils is in no way impaired at the reduced treat rates. Taking into account that an addition of 10% by weight of a polar low viscosity base stock with strong dissolving power is not uncommon in industrial gear oils based on apolar base stocks, this is an excellent result for the polyacrylates.

The invention claimed is:

1. A lubricant formulation, comprising:
  a base oil comprising at least one polyalkyl acrylate, wherein the at least one polyalkyl acrylate comprises:
  (a) 95 to 100% by weight of at least one branched $C_{8-10}$-alkyl acrylate; and
  (b) 0 to 5% by weight of at least one $C_{1-20}$-alkyl (meth) acrylate,
  wherein a weight-average molecular weight of the at least one polyalkyl acrylate is in the range of 7,000 to 25,000 g/mol and a residual monomer content is 0.1% by weight or lower.

2. The lubricant formulation according to claim 1, wherein the at least one polyalkyl acrylate consists of 100% by weight of the at least one branched $C_{8-10}$-to-alkyl acrylate.

3. The lubricant formulation according to claim 1, wherein the at least one branched $C_{8-10}$-alkyl acrylate is selected from the group consisting of 2-ethylhexyl acrylate and 2-propylheptyl acrylate.

4. A base oil composition, comprising:
  (A) 70 to 95% by weight of at least one polyalkyl acrylate, comprising:
  (a) 95 to 100% by weight of at least one branched $C_{8-10}$-alkyl acrylate; and
  (b) 0 to 5% by weight of at least one $C_{1-20}$-alkyl (ineth)acrylate,
  wherein a weight-average molecular weight of the at least one polyalkyl acrylate is in the range of 7,000 to 25,000 g/mol and a residual monomer content is 0.1% by weight or lower; and
  (B) 5 to 30% by weight of a base oil selected from the group consisting of API Group oils, API Group III oils, API Group IV oils, and mixtures thereof,
  based on a total weight of the base oil composition.

5. The base oil composition according to claim 4, wherein the at least one polyalkyl acrylate consists of 100% by weight of the at least one branched $C_{8-10}$-to-alkyl acrylate.

6. The base oil composition according to claim 4, wherein the at least one branched $C_{8-10}$-to-alkyl acrylate is selected from the group consisting of 2-ethylhexyl acrylate and 2-propylheptyl acrylate.

7. The base oil composition according to claim 4, wherein the at least one branched $C_{8-10}$-to-alkyl acrylate is ethylhexyl acrylate.

8. The base oil composition according to claim 4, wherein the base oil composition is an industrial gear oil.

9. A polyalkyl acrylate, comprising:
  (a) 95 to 100% by weight of at least one branched $C_{8-10}$-alkyl acrylate; and
  (b) 0 to 5% by weight of at least one $C_{1-20}$-alkyl (meth) acrylate,
  wherein a weight-average molecular weight of the polyalkyl acrylate is in the range of 7,000 to 25,000 g/mol and a residual monomer content is 0.1% by weight or lower.

10. The polyalkyl acrylate according to claim 9, consisting of 100% by weight of the at least one branched $C_{8-10}$-alkyl acrylate.

11. The polyalkyl acrylate according to claim 9, wherein the at least one branched $C_{8-10}$-alkyl acrylate is selected from the group consisting of 2-ethylhexyl acrylate and 2-propylheptyl acrylate.

12. The polyalkyl acrylate according to claim 9, wherein the at least one branched $C_{8-10}$-alkyl acrylate is ethylhexyl acrylate.

13. A lubricating composition, comprising:
  (A) 20 to 60% by weight of at least one polyalkyl acrylate, comprising:
  (a) 95 to 100% by weight of at least one branched Cs-to-alkyl acrylate; and
  (b) 0 to 5% by weight of at least one $C_{1-20}$-alkyl (meth)acrylate, based on a total weight of the at least one polyalkyl acrylate,
  wherein a weight-average molecular weight of the at least one polyalkyl acrylate is in the range of 7,000 to 25,000 g/mol and a residual monomer content is 0.1% by weight or lower;
  (B) 40 to 80% by weight of a base oil selected from the group consisting of API Group II oils, API Group III oils. API Group IV oils, and mixtures thereof, and
  (C) 0 to 5% by weight of one or more additives,
  based on a total weight of the lubricating composition.

14. The lubricating composition according to claim 8, wherein the one or more additives are selected from the group consisting of pour point depressants, dispersants, defoamers, detergents, demulsifiers, antioxidants, antiwear additives, extreme pressure additives, friction modifiers, anticorrosion additives, dyes and mixtures thereof.

15. A process for preparing at least one polyalkyl acrylate, the process comprising:
(i) charging a reaction vessel with a base oil;
(ii) heating the base oil of (i) to a reaction temperature of 130° C. to 170° C.;
(ii) constantly feeding a mixture of at least one branched $C_{8-10}$-alkyl acrylate and 0.1 to 1.2% of an initiator, based on an amount of the at least one branched $C_{8-10}$-alkyl acrylate, to the reaction vessel over a time of 120 to 240 minutes, to obtain a reaction mixture;
(iv) optionally, stirring the reaction mixture obtained under (iii) for another 50 to 90 minutes, and
(v) cooling the reaction mixture obtained under (iv) to an ambient temperature and obtaining the at least one polyalkyl acrylate;

wherein the at least one polyalkyl acrylate comprises:
(a) 95 to 100% by weight of the at least one branched $C_{8-10}$-alkyl acrylate, and
(b) 0 to 5% by weight of at least one $C_{1-20}$-alkyl (meth) acrylate,
wherein a weight-average molecular weight of the at least one polyalkyl acrylate is in the range of 7,000 to 25,000 g/mol and a residual monomer content is 0.1% by weight or lower.

16. The lubricant formulation according to claim 1, wherein the lubricant formulation is an industrial gear oil formulation.

17. The process of claim 15, wherein the process optionally further comprises filtering the reaction mixture, and wherein the process does not comprise further purification, other than the optional filtering.

18. The polyalkyl acrylate according to claim 9, consisting of 100% by weight of 2-ethylhexyl acrylate, 2-propylheptyl acrylate, or a combination thereof.

* * * * *